Figure 1:
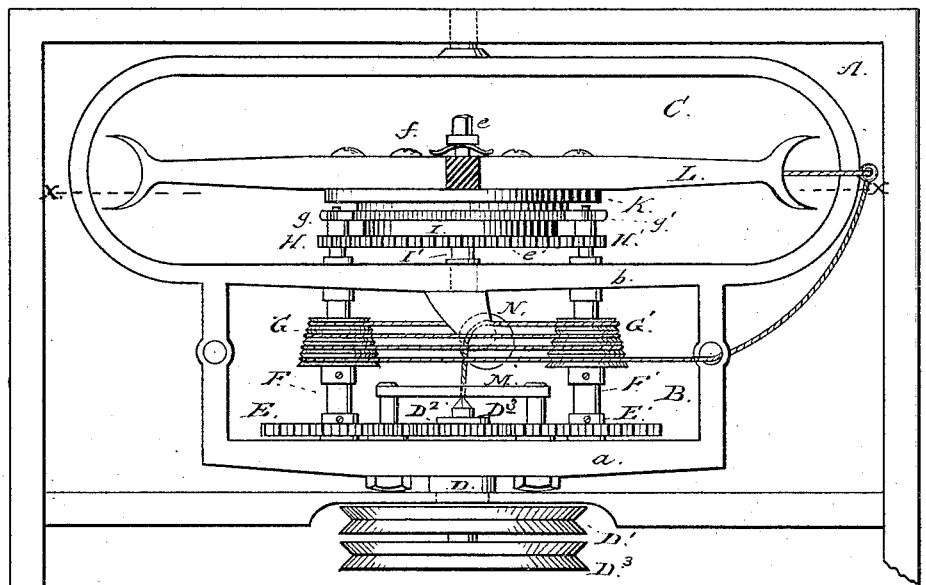

(No Model.)

G. L. BROWNELL.
MACHINE FOR MAKING TWINE AND CORDAGE.

No. 286,258. Patented Oct. 9, 1883.

Attest:
F. W. Howard
O. Fred Heller

Inventor:
George L. Brownell
By Parker & Sweet Jr.
atty.

UNITED STATES PATENT OFFICE.

GEORGE L. BROWNELL, OF WORCESTER, MASSACHUSETTS.

MACHINE FOR MAKING TWINE AND CORDAGE.

SPECIFICATION forming part of Letters Patent No. 286,258, dated October 9, 1883.

Application filed December 20, 1882. (No model.)

*To all whom it may concern:*

Be it known that I, GEORGE L. BROWNELL, a citizen of the United States, residing at Worcester, in the county of Worcester and State of Massachusetts, have invented certain new and useful Improvements in Machines for Making Twine and Cordage; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to machines for making twine and cord, but more particularly to that form of machine illustrated in a former patent granted to me under date of April 16, 1878, and numbered 202,406, to which reference may be had in connection with the following specification for a more thorough understanding of my present invention. In the machine shown in my former patent, the reel, being geared directly with the shafts, draws off the twisted cord or twine without any provision being made for regulating the speed of the reel, relatively to the drawing-off devices, as the former increases in size by reason of the accumulation of the twine or cord thereon, and the twine or cord is drawn down and frequently broken, especially when the reel is nearly full.

The object of my present invention is to obviate this difficulty; and my invention consists in providing a means which will permit of the reel turning upon its shaft when the tension upon the cord or twine becomes too great, and which will also prevent the reel from being carried forward by its own momentum when the mechanism is stopped, thereby preventing the injurious effect upon the cord or twine which would result from such action. This I accomplish by arranging the reel upon the shaft, as illustrated in my drawings, described in my specification, and particularly pointed out in the appended claims.

Figure 3:
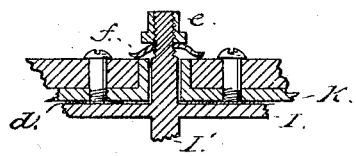
Figure 2:
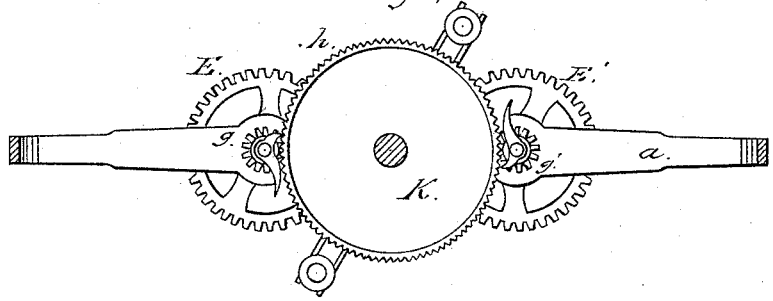
Figure 4:
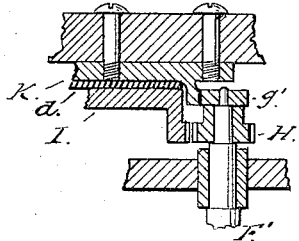

In the accompanying drawings, Figure 1 represents a front elevation of so much of a machine as is necessary for the illustration of my invention. Fig. 2 is a transverse section taken on the line $x\ x$ of Fig. 1, and Figs. 3 and 4 are detail sectional views thereof.

The above figures of the drawings illustrate a portion only of my machine, the remaining parts thereof being similar to those illustrated in my former patent, and are not necessary to an understanding of my present invention, and have been omitted therefrom.

In carrying out my present invention the revolving frame A is journaled in the upper part of the main frame, as illustrated in my former patent, the said revolving frame being divided into two compartments, the lower one, B, of which contains the mechanism for twisting, stretching, and drawing off the cord, while the upper one, C, contains the mechanism for winding the same.

The letter D represents a hollow tube, having its bearings in the bottom rail, $a$, of the lower compartment, B, and which is provided at its base with a scored pulley, D', and at its top with a cog-gear, $D^2$, both being rigidly secured to said tube. This cog-gear $D^2$ meshes into and revolves the gear-wheels E E', which are secured to the vertical shafts F F' on the same line with said cog-gear $D^2$.

To the central parts of the upright shafts F F' are attached the vertically arranged and scored cones G G', the said shafts having their bearings in the lower rail, $a$, and in the central rail, $b$, dividing the two compartments B C, as shown in Fig. 1. The upper portions of these shafts F F' project a short distance into the upper compartment, C, where they are provided with small gears H H', which mesh into the cogs or teeth $e'$ upon the circumference of the gear I, and which gives a positive motion to the same, the said gear being formed solid with or otherwise rigidly attached to the upright shaft I', which is journaled in the central rail, $b$, between the two compartments, as fully shown in the drawings. Above the said gear I, and journaled upon the shaft I' of the same, is provided a circular plate, K, which carries the arms of the reel L, the said plate being driven by friction from the gear I, which will permit of the reel turning upon its shaft when the tension upon the cord or twine becomes too great.

$d$ represents a leather or other suitable washer, arranged between gear I and plate K, a suitable thumb-screw, $e$, engaging with the screw-threads upon the upper part of the upright shaft I′, to regulate the friction and control the motion of the reel.

Beneath the thumb-screw $e$, and between it and the inner arms of the reel, is provided a spring-washer, $f$, which is adapted to take up the wear in the leather washer $d$, to secure an even friction. Upon the tops of the vertical shafts F F′ are provided pawls or dogs $g\,g'$, the teeth of which are held against the toothed rim $h$ of the plate K by the centrifugal force which tends to carry outward the tails of said pawls or dogs when the machine is in operation, the object of said construction being such as to prevent the reel from being carried forward by its own momentum when the mechanism is stopped, which it would otherwise be liable to do when the said reel is full of twine or cord, and which would loosen the tension and allow the twine or cordage to slip upon the scored cones G G′ and be instantly twisted off or broken. When the mechanism fully stops and the danger of the cord being broken is over, the tails of the pawls or dogs $g\,g'$ can be pressed in, thereby withdrawing their teeth from the toothed rim $h$ of the plate K and allowing the twine or cord to be pulled off the reel.

It will be observed that the toothed rim $h$ of the plate K projects down over the upper edge of the lower gear, I, as fully shown in the detail sectional views, to exclude dust or other foreign substances from between the two plates.

In the lower part of the main frame of my machine are arranged the usual spools or bobbins and fliers, which supply the strands of thread to the mechanism in the lower part of the revolving frame A; and the hollow tube D is also provided with a spindle, $D^3$, having a laying-block in the upper portion thereof, through which pass the several strands to be twisted before entering the compressor M and passing over the grooved pulley N to the scored cones G G′, and from thence to the reel L, in a manner well known and already secured to me in previous Letters Patent of the United States, the revolving frame A being provided with a score-pulley at its bottom, to impart the necessary motion to said frame.

Having described my invention, what I claim is—

1. The revolving frame A, divided into two compartments, B C, and provided with the vertical shafts F F′, having scored cones G G′, gear-wheels E E′ and H H′, and pawls $g\,g'$, in combination with the central tube, D, having scored pulley D′ and cog-gearing $D^2$, and the gear I and plate K, substantially as and for the purpose specified.

2. The gear I and the vertical shaft I′, in combination with the plate K, having the toothed rim $h$, reel L, pawls $g\,g'$, gear-wheels H H′, and the vertical shafts F F′, and means for rotating said shafts, substantially as specified.

3. The gear I, vertical shaft I′, gear-wheels H H′, the shafts F F′, and means for rotating said shafts, in combination with the plate K′, journaled upon the shaft I′, and having the toothed rim $h$, reel L, clamping-screw $e$, spring-washer $f$, and leather washer $d$, all substantially as and for the purpose specified.

In testimony whereof I affix my signature in presence of two witnesses.

GEORGE L. BROWNELL.

Witnesses:
 CHARLES F. ALDRICH,
 ISAAC D. GOULDING.